United States Patent [19]

Raleigh et al.

[11] Patent Number: 5,292,827
[45] Date of Patent: Mar. 8, 1994

[54] EPOXY-CAPPED BRANCHED SILICONES AND COPOLYMERS THEREOF

[75] Inventors: William J. Raleigh, Rensselaer, N.Y.; Michael A. Lucarelli, Mattoon, Ill.; James F. Hoover, Evansville, Ind.

[73] Assignee: General Electric Company, Waterford, N.Y.

[21] Appl. No.: 23,187

[22] Filed: Feb. 25, 1993

[51] Int. Cl.$^5$ .............................................. C08G 65/48
[52] U.S. Cl. ................................. 525/390; 525/420; 525/431; 525/461; 525/474; 525/476; 528/40
[58] Field of Search ............... 525/390, 420, 431, 461, 525/474, 476; 528/40

[56] References Cited

U.S. PATENT DOCUMENTS

| | | | |
|---|---|---|---|
| 4,082,719 | 4/1978 | Liles et al. | 260/37 |
| 4,141,926 | 2/1979 | Ariga et al. | 260/824 |
| 4,283,513 | 8/1981 | Mikami | 525/476 |
| 4,287,326 | 9/1981 | Mikami | 525/476 |
| 4,331,704 | 5/1982 | Watson, Jr. et al. | |
| 4,640,967 | 2/1987 | Eckberg | 528/26 |
| 4,707,529 | 11/1987 | Hoffman et al. | 525/476 |
| 4,977,198 | 12/1990 | Eckberg | 522/25 |
| 5,034,446 | 7/1991 | Kendall et al. | 525/476 |
| 5,037,861 | 8/1991 | Crivello et al. | 522/172 |

*Primary Examiner*—Melvyn I. Marquis

[57] ABSTRACT

There is disclosed a novel epoxy-modified branched epoxy copolymerizate which can be copolymerized with other thermoplastics, such as polycarbonates, to modify melt flow.

31 Claims, No Drawings

EPOXY-CAPPED BRANCHED SILICONES AND COPOLYMERS THEREOF

The present invention relates to branched silicones having a T or Q siloxy unit in the polymer structure and which are modified with an epoxy group. More particularly, the present invention relates to the use of the branched silicones as a copolymerizate with other thermoplastic resins.

BACKGROUND OF THE PRESENT INVENTION

Epoxy resins have many desirable properties which make them attractive as coatings, adhesives, paper release agents, additives for printing inks and for other applications. Included among these desirable properties are low viscosity, excellent clarity, high gloss and high reactivity.

Epoxy-modified silicone resins based on linear siloxy groups have also been prepared having improved heat-resistance, anti-corrosion resistance and water-resistance over the epoxy resins.

Mikami, U.S. Pat. No. 4,283,513, discloses siloxane-modified epoxy resin compositions comprising siloxane-modified epoxy resins, alkoxy functional organopolysiloxanes, and curing agents which have improved resistance to degradation of electrical properties by boiling water and moisture.

Mikami, U.S. Pat. No. 4,287,326, describes siloxane-modified epoxy resin compositions consisting essentially of siloxane modified epoxy resins, organofunctional alkoxysilicone compounds and curing agents which have improved degradation resistance to both electrical and adhesion properties when exposed to moisture or boiling water.

Liles et al., U.S. Pat. No. 4,082,719, disclose silicone epoxy curable compositions which teach the admixing of a small amount of an organosilicone compound containing at least one silicon-bonded hydrogen atom with curable compositions comprising a hydroxy-containing organosilicone compound, an epoxy compound and an aluminum compound to improve the curing performance of the compositions.

Crivello et al., U.S. Pat. No. 5,037,861, disclose cyclic epoxy functional siloxanes of the formula $((R'R'')SiO)_n$ which has low initial viscosity yet are highly reactive in cationic photo-initiated polymerization reactions.

Hoffman et al., U.S. Pat. No. 4,707,529, disclose a dispersion of a siloxane polymer and optional dispersion stabilizer in an epoxy compound as a continuous phase, wherein the siloxane polymer is grafted to the epoxide compound. The patentees teach that the siloxane polymers which have functional groups capable of forming a graft with the epoxy compound continuous phase can include T-structure polydimethylsiloxanes having vinyl functionality(ies) at the branchpoint(s).

Special mention is made of Eckberg, U.S. Pat. No. 4,977,198, which teaches that UV curable epoxy functional organopolysiloxanes can be prepared by reacting organopolysiloxane hydrides with unsaturated epoxy groups in the presence of a platinum catalyst. Eckberg discloses that the epoxy functional silicones have an increased capacity to solubilized onium salt photoinitiators.

None of the references however teach or suggest the preparation of a branched epoxy-modified siloxane copolymerizate wherein the siloxane comprises a T or Q siloxy group. It has now been found that novel epoxy-modified branched silicones can be produced by reacting an epoxy with a T-structure or Q-structure silicon hydride compound, which have many excellent physical properties; and which are useful in forming improved copolymers with a variety of thermoplastic resins.

SUMMARY OF THE PRESENT INVENTION

According to the present invention there is provided a novel branched epoxy-modified silicone copolymerizate having the following general formulae:

$$T_{z-2}D_xM'_z \text{ or } Q_yD_xM'_{2y+2}$$

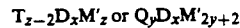

wherein T represents an trifunctional silicone of the formula $RSiO_{1.5}$ where R is a monovalent alkyl, cycloalkyl or phenyl group, D represents a difunctional silicone of the formula $R_2SiO$ where each R is independently as defined above, x is 0 or an integer of 1 or greater, Q is a quadrifunctional silicone of the formula $SiO_2$, M' is an epoxy-modified monofunctional silicone of the formula $R^1{}_3SiO_{0.5}$ where each $R^1$ is a monovalent alkyl, cycloalkyl or phenyl group or an epoxy group provided at least one $R^1$ is an epoxy group, y is an integer of from 1 to 4, inclusive, and z is an integer of greater than or equal to 3, typically from 3 to 12 inclusive.

Also according to the present invention, there is provided a novel process for preparing the epoxy-modified branched silicone copolymerizates of the present invention comprising reacting a trifunctional or quadrifunctional silicone hydride of the formula $T_{z-2}D_xM''_z$ or $Q_yD_xM''_{2y+2}$, where T represents a trifunctional silicone of the formula $RSiO_{1.5}$ where R is a monovalent alkyl, cycloalkyl or phenyl group, D represents a difunctional silicone of the formula $R_2SiO$ where each R is independently as defined above, x is 0 or an integer of 1 or greater, Q is a quadrifunctional silicone of the formula $SiO_2$, M'' represents a monofunctional silicone of the formula $R^2{}_3SiO_{0.5}$ wherein each $R^2$ is hydrogen or a monovalent alkyl cycloalkyl or phenyl group provided at least one $R^2$ is hydrogen, y is an integer from 1 to 4 inclusive and z is an integer of greater than or equal to 3, typically from 3 to 12 inclusive, with an epoxy compound in the presence of an effective amount of a catalyst.

The present invention further provides for the preparation of copolymers of epoxy-modified branched siloxanes with thermoplastics containing active hydrogen substituents.

DETAILED DESCRIPTION OF THE PRESENT INVENTION

The present invention provides novel epoxy-modified branched silicone copolymerizates based on T or Q silicones.

The T based branched silicone copolymerizates of the present invention are those of the general formula:

$$T_{z-2}D_xM'_z$$

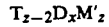

wherein T represents a trifunctional silicone of the general formula $RSiO_{1.5}$ where R is a monovalent substituted or unsubstituted $C_{1-12}$ alkyl, $C_{1-12}$ cycloalkyl or phenyl group, preferably R is methyl; D represents a difunctional silicone of the general formula $R_2SiO$ wherein each R is independently as defined above; x is 0 or an integer of 1 or greater, and preferably ranges from about 5 to about 200, more preferably from about 10 to about 150; M' is a monofunctional silicone of the general formula $R^1_3SiO_{0.5}$ wherein each $R^1$ is independently a monovalent substituted or unsubstituted $C_{1-12}$ alkyl, $C_{1-12}$ cycloalkyl, a phenyl group or an epoxy group; provided at least one $R^1$ group is an epoxy group; and z is an integer of greater than or equal to 3, typically from 3 to 12 inclusive.

The Q based silicone copolymerizates are those of the general formula:

$$Q_yD_xM'_{2y+2}$$

wherein Q is a quadrifunctional silicone of the formula $SiO_2$, D represents difunctional silicone of the general formula $R_2SiO$ wherein each R is as defined above; x is 0 or an integer of 1 or greater, and preferably ranges from about 5 to about 200, more preferably from about 10 to about 150; M' is a monofunctional silicone of the general formula $R^1_3SiO_{0.5}$ wherein each $R^1$ is independently a monovalent substituted or unsubstituted $C_{1-12}$ alkyl, $C_{1-12}$ cycloalkyl, a phenyl group or an epoxy group; provided at least one $R^1$ group is an epoxy group; and y is an integer of from 1 to 4, inclusive.

Suitable epoxy groups for use in the present invention vary widely. Typically they include vinyl or allylic functional epoxy compounds containing olefinic groups such as, but not limited to, allylglycidylether, glycidyl acrylate, vinyl norbornene monoxide, dicyclopentadiene monoxide, 4-vinylcyclohexene oxide and mixtures of any of the foregoing. These and others are commercially available and are disclosed in the literature. Particularly suitable for use in the present invention is 4-vinylcyclohexene oxide.

The compositions of the present invention are typically prepared by reacting a T or Q silicon hydride precursor with the epoxy group in the presence of a catalyst, preferably a platinum catalyst. The silicone hydride precursor useful in the practice of the present invention is generally formed by adding a $T_{z-2}D_xM_z$ or $Q_yD_xM_{2y+2}$ silocane to a reaction vessel, wherein T, Q, D, x, y and z are as above defined and M represents a monofunctional silicone of the formula $R_3SiO_{0.5}$ where each R is the same or different monovalent substituted or unsubstituted $C_{1-12}$ alkyl, $C_{1-12}$ cycloalkyl or phenyl group, heating the reaction vessel to a temperature of from about 50° to about 150° C. in the presence of an equilibration catalyst, cooling and neutralizing the reaction mixture; and recovering the trifunctional or quadrifunctional branched siloxane hydride.

The $T_{z-2}D_xM_z$ or $Q_yD_xM_{2y+2}$ siloxane can be prepared by methods known to those skilled in the art, such as by the co-hydrolysis of an alkyltrichlorosilane with the corresponding dialkylchlorosilane. It is also contemplated as within the scope of the present invention, that a siloxane tetramer and/or a tetraalkyldisiloxane component, such as tetramethyldisiloxane, can be added to the reaction vessel with the $T_{z-2}D_xM_z$ or $Q_yD_xM_{2y+2}$ siloxane. Further, other siloxanes, such as methyl hydride cyclics and hexamethylsiloxanes can also be added to the reaction mixture.

The equilibration catalyst can be any of those known to persons of skill in the art such as an acid clay, e.g. Filtrol ® 20, from Harshaw Chemical Co., or carbon black and a mineral acid, such as sulfuric acid, and/or an organic acid. Typically, from about 0.1 to about 2.0 weight percent of equilibration catalyst based on the weight of the siloxane reactants is added to the reaction mixture.

The hydride forming reaction is then carried out at a temperature of from about 50° to about 150° C., preferably about 100° C., for a time of from about 3 to about 5 hours. The reaction mixture is cooled to a temperature of about 50° C. and neutralized by the addition of a neutralizing agent. Typically the neutralizing agent is a magnesium oxide, but may also comprise other basics. The cooled and neutralized mixture is then filtered, such as through a Celite filter, to remove impurities.

The epoxy-modified branched silicone copolymerizates of the present invention are then prepared by reacting the trifunctional or quadrifunctional silicone hydride of the formula $T_{z-2}D_xM''_z$ or $Q_yD_xM''_{2y+2}$, where T represents a trifunctional silicone of the formula $RSiO_{1.5}$ where R is a monovalent alkyl, cycloalkyl, phenyl group, D represents a difunctional silicone of the formula $R_2SiO$ where each R is independently as defined above, x is 0 or an integer of 1 or greater, preferably from about 5 to about 200, more preferably from about 10 to about 150, Q is a quadrifunctional silicone of the formula $SiO_2$, M" represents a monofunctional silicone of the formula $R^2_3SiO_{0.5}$ wherein $R^2$ is hydrogen or a monovalent alkyl, cycloalkyl or phenyl group provided at least one $R^2$ is hydrogen, y is an integer of from 1 to 4 inclusive, and z is an integer greater than or equal to 3, typically from 3 to 12 inclusive, with an epoxy compound in the presence of an effective amount of a hydrosilation catalyst.

Suitable hydrosilation catalysts to be employed in the present invention are known to persons skilled in the art and include transition group metal catalysts utilizing such precious metals as ruthenium, rhodium, palladium, osmium, iridium, copper and platinum, and complexes of these metals. Preferred are platinum and rhodium metal catalysts. Examples of such hydrosilation catalysts are described in, inter alia, Lamoreaux, U.S. Pat. No. 3,220,972; Karstedt, U.S. Pat. Nos. 3,715,334; 3,775,452 and 3,814,730.

For example, a T siloxane hydride can be reacted with 4-vinylcyclohexene oxide according to the following general reaction scheme:

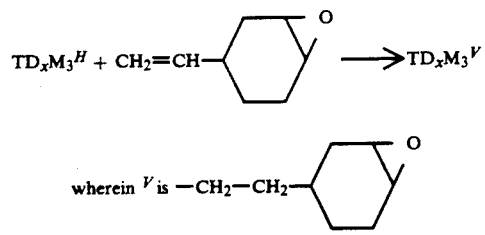

The product epoxy modified copolymerizates are useful in providing improved copolymers with a wide variety of thermoplastic resins having alcohol and/or amine substituents. Exemplary, but non-limiting, thermoplastics for use herein are those such as polycarbonates, polyphenylene ethers, polyols and polyamines.

Copolymerization occurs between the epoxy group on the siloxane and the active hydrogen, i.e., hydroxy or amine, present in the thermoplastic. The amount siloxane copolymerizate copolymerized with the thermoplastic can vary widely. Typically from about 0.1 to about 50 weight percent, preferably from about 0.1 to about 25 weight percent, more preferably from about 0.1 to about 10 weight percent, and most preferably from about 0.1 to about 5 weight percent of epoxy-modified siloxane copolymerizate is copolymerized with the thermoplastic.

The copolymerization is described below with regard to polycarbonate, however, any thermoplastic containing an active alcohol or amine substituent may be employed, such as polyphenylene ethers, nylons and polyols.

The polycarbonates useful in the practice of the present invention are well known to those skilled in the art and can comprise non-aromatic as well as aromatic forms.

With respect to the copolymer aromatic polycarbonates of the present invention, these may be prepared by reacting a dihydric phenol and the epoxy-modified branched siloxanes of the present invention with a carbonate precursor, such as phosgene, a haloformate or carbonate ester.

By dihydric phenols is meant mononuclear or polynuclear aromatic compounds containing two hydroxy radicals, each of which is attached to a carbon atom of an aromatic nucleus. Typically, the dihydric phenols include, but are not limited to, 2,2-bis(4-hydroxyphenyl)propane; 2,2-bis(3,5-dimethyl-4-hydroxyphenyl)propane; 4,4'-di-hydroxydiphenyl ether; bis(2-hydroxyphenyl)methane, mixtures thereof and the like. The preferred dihydric phenol is 2,2-bis(4-hydroxyphenyl)propane or bisphenol-A.

The epoxy functional branched siloxane is added to the dihydric phenol in a solvent, and the reaction proceeds by the addition of the carbonate precursor. The resulting copolymers having improved properties such as branching, melt flow and melt viscosity, and can then be molded into a wide variety of useful commercial products.

DESCRIPTION OF THE PREFERRED EMBODIMENTS

The following examples illustrate the present invention. They are not to be construed to limit the scope of the appended claims in any manner whatsoever.

EXAMPLE 1

245.6 g of vinylcyclohexene oxide (VCHO) and 237.4 g of toluene were azeotroped dry. 0.01 g of a rhodium catalyst was added. The mixture was maintained at 100° C.

763 g of a branched hydride ($TD_{12}M^H_3$ wherein $M^H$ represents a siloxane of the formula $H_3SiO_{0.5}$) was added over a period of 30 minutes, during which the temperature was maintained at 100°-125° C. until infrared spectroscopy indicated that no hydride remained. 1 g of an amine stabilizer was then added and the toluene was stripped off under vacuum to give the final product as a clear fluid.

EXAMPLE 2

186.0 g of vinylcyclohexene oxide (VCHO) and 180 g of toluene were azeotroped dry. 0.02 g of a rhodium catalyst was added. The mixture was maintained at 100° C.

1233.0 g of a branched hydride ($TD_{30}M^H_3$) was added over a period of 30 minutes, during which the temperature was maintained at 100°-125° C. until infrared spectroscopy indicated that no hydride remained. 1.4 g of an amine stabilizer was then added and the toluene was stripped off under vacuum to give the final product as a clear fluid.

EXAMPLE 3

37.0 g of vinylcyclohexene oxide (VCHO) was azeotroped dry. 0.036 g of a rhodium catalyst was added. The mixture was maintained at 100° C.

1000.0 g of a branched hydride ($TD_{135}M^H_3$) was added over a period of 30 minutes, during which the temperature was maintained at 75°-125° C. until infrared spectroscopy indicated that no hydride remained. 0.1 g of an amine stabilizer was then added and the toluene was stripped off under vacuum to give the final product as a clear fluid.

EXAMPLE 4

The general procedure of Example 1 is followed to prepare a branched epoxy fluid of the formula $TD_{50}M'_3$. 5 weight percent of the epoxy fluid is then copolymerized with a poly(bisphenol A)carbonate. The resulting resin is analyzed by $^1H$ NMR and found to have 4.4 weight percent dimethylsiloxane. The resin was washed with hexane and re-analyzed by $^1H$-NMR and found to have 4.3 weight percent siloxane. The very low change in percent siloxane indicates that the siloxane is incorporated into the polycarbonate. Further, no change in the spectrum was noted after the washing.

EXAMPLE 5

Polycarbonate Control (5A*)

To a two liter, five neck Morton flask is added bisphenol-A (57.0 g., 0.25 mole), dichloromethane (600 mL), water (500 mL), triethylamine (0.76 g, 1.0 mL, 0.0075 mole) and phenol (0.78 g, 0.0083 mole). The flask is equipped with a reflux condenser, an overhead stirrer, an inlet for 25% aqueous sodium hydroxide solution, a pH probe and an inlet for phosgene. The biphasic mixture is rapidly stirred, brought to a pH 10 and phosgene (32 g, 0.32 moles) is introduced over the course of 16 minutes. The pH is maintained between 10 and 11 over the course of the phosgenation by adding 25% aqueous sodium hydroxide solution. Excess phosgene is sparged from the flask and the aqueous phase is separated from the organic phase. The organic phase is diluted with dichloromethane (200 mL) washed twice with 1 liter of 1% aqueous hydrochloric acid solution and three times with 1 liter of water. The polycarbonate is precipitated by pouring the dichloromethane solution into boiling water in a rapidly stirring blender, and then filtering off the resin. The resin powder is dried at 110° C. for 12 hours. Weight average molecular weight by gel permeation chromatography (GPC) is 32,300. Glass transition temperature ($T_g$) by Differential Scanning Calorimetry (DSC) is 152° C.

Comparative Linear Epoxy Copolymer (5B*)

The polycarbonate control polymerization is repeated except $M'D_{50}M'$ (0.7 g, 1 weight % siloxane), wherein M' is a vinylcyclohexene oxide-modified monofunctional siloxane and D is a dimethylsiloxane, is added to the reactor prior to addition of phosgene. The resin is isolated as described above. Weight averaged molecular weight by GPC is 30,800. $T_g$ by DSC is 151°. The linear epoxy fluid had a pour point of −70° F.

Branched Epoxy Copolymer (5)

The polycarbonate control polymerization is repeated except $TD_{50}M'_3$ (0.7 g, 1 weight percent siloxane), wherein T is a trimethylsiloxane, D is a dimethylsiloxane and M' is a vinylcyclohexene oxide-modified monofunctional siloxane, is added to the reactor prior to addition of phosgene. The resin is isolated as described above. Weight averaged molecular weight by GPC is 31,000. $T_g$ by DSC is 151° C. The branched epoxy fluid had a pour point of −120° F.

Melt Flow

The resins produced in 5A*, 5B* and 5 are converted into tough films by pressing the powder between heated plates (270° C., <500 psig). The films are cut into pellets and the pellets are used to determine melt flow. The melt flow is determined from the Kasha Index (KI). KI is measured by placing 7 g of dried (4 hours at 120° C.) pellets in a modified Tinius-Olsen T3 melt indexer, the temperature in the indexer is maintained at 300° C. and the resin is heated at this temperature for 6 minutes; after 6 minutes, the resin is forced through a 1.05 mm radius orifice using a plunger of 4.7 mm radius and an applied force of 7.7 kg; the time for the plunger to travel 5.1 cm is measured in centiseconds and this value is reported as the KI. The higher the KI, the higher the melt viscosity, and the lower the melt flow. Melt flow can be calculated by dividing 35,000 by KI.

The results along with compositional data are set forth below in Table 1.

TABLE 1

| Example | 5A* | 5B* | 5 |
|---|---|---|---|
| Composition, wt % | | | |
| Polycarbonate[a] | 100 | 99 | 99 |
| M'D$_{50}$M' | — | 1 | — |
| TD$_{50}$M'$_3$ | — | — | 1 |
| Phenol endcap, % | 3.3 | 3.3 | 3.3 |
| Properties | | | |
| Molecular weight[b] | 32300 | 30800 | 31000 |
| T$_{gc}$ °C. | 152 | 151 | 151 |
| KI | 3540 | 4200 | 5190 |
| Melt flow[d] | 9.9 | 8.3 | 6.7 |

*Comparative example
[a]Control
[b]Weight averaged
[c]Kasha Index. Higher KI values indicate less flow.
[d]Calculated melt flow in g/10 minutes. KI is converted to melt flow by dividing 35000 by KI.

From the KI data and calculated melt flow, it is found that the resin prepared using the branched $TD_{50}M'_3$ siloxane has a higher KI and lower melt flow than the resin prepared using the linear $M'D_{50}M'$ which has a higher KI and lower melt flow than the polycarbonate control. The data indicates that the epoxy functionalized polysiloxane groups are incorporated into the polycarbonate in such a way as to modify the melt flow. The large increase in KI value indicates that the branched epoxy fluid of the present invention acts as an effective branching agent in the polycarbonate.

EXAMPLE 6

Films prepared from each of the copolymers of Examples 5A*, 5B* and 5, respectively, were autoclaved for 96 hours at 115° C. and 15 psig. After removal, the films were cut into pellets and the KI is measured.

The results are set forth below.

| Copolymer | KI | MF |
|---|---|---|
| 5A* | 3340 | 10.5 |
| 5B* | 3210 | 10.9 |
| 5 | 3780 | 9.3 |

KI represents Kasha Index and MF represents calculated melt flow in g/10 min.

From the data above, it can be seen that the epoxy functionalized modified resins have maintained molecular weight integrity after autoclaving, and that the resin prepared using the $TD_{50}M'_3$ siloxane has the highest melt viscosity due to branching.

The above-mentioned patents are hereby incorporated by reference.

Many variations of the present invention will suggest themselves to those skilled in the art in light of the above-detailed description. For example, the T-based siloxanes can be modified with other epoxy groups such as allylglycidylether, glycidyl acrylate, vinyl norbornene monoxide, dicyclopentadiene monoxide and mixtures thereof. Further, Q-based siloxanes may be employed instead of the T-based siloxanes. It is further contemplated that copolymers of the branched epoxy modified siloxanes can be formed with other thermoplastic resins such as poly(2,6-dimethyl-1,4-phenylene ether), nylons and polyols. All such obvious modifications are within the full intended scope of the appended claims.

We claim:

1. A thermoplastic copolymer composition comprising:
   (a) a thermoplastic polymer having alcohol and/or amine substituents; and
   (b) a branched epoxy-modified silicone copolymerizate having the following general formulae:

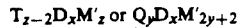

$T_{z-2}D_xM'_z$ or $Q_yD_xM'_{2y+2}$ wherein T represents a trifunctional silicone of the formula $RSiO_{1.5}$ where R is a monovalent alkyl, cycloalkyl or phenyl group, D represents a difunctional silicone of the formula $R_2SiO$ where each R is independently as defined above, x is 0 or an integer of 1 or greater, Q is a quadrifunctional silicone of the formula $SiO_2$, M' is an epoxy-modified monofunctional silicone of the formula $R^1{}_3SiO_{0.5}$ where $R^1$ is a monovalent alkyl, cycloalkyl or phenyl group or an epoxy group provided at least one $R^1$ is an epoxy group, y is an integer of from 1 to 4, inclusive, and z is an integer of 3 or greater.

2. A copolymer as defined in claim 1 wherein said thermoplastic polymer comprises a polycarbonate, a polyphenylene ether, a polyamine, a polyol or a mixture of any of the foregoing.

3. A copolymer as defined in claim 2 wherein said polyphenylene ether comprises poly(2,6-dimethyl-1,4-phenylene ether).

4. A copolymer as defined in claim 2 wherein said polycarbonate comprises poly(bisphenol A)carbonate.

5. A copolymer as defined in claim 1 wherein said component (b) comprises from about 0.1 to about 5 weight percent of said copolymer.

6. A copolymer composition as defined in claim 1 wherein said branched epoxy-modified silicone copolymerizate is of the formula $T_{z-2}D_xM'_z$ wherein T represents a trifunctional silicone of the formula $RSiO_{1.5}$ where R is a monovalent alkyl, cycloalkyl or phenyl group, D represents a difunctional silicone of the formula $R_2SiO$ where each R is independently as defined above, x is 0 or an integer of 1 or greater, M' is an epoxy-modified monofunctional silicone of the formula $R^1_3SiO_{0.5}$ where $R^1$ is a monovalent alkyl, cycloalkyl or phenyl group or an epoxy group provided at least one $R^1$ is an epoxy group, and z is an integer of 3 or greater.

7. A copolymer as defined in claim 1 wherein said branched epoxy-modified silicone copolymerizate is of the formula $Q_yD_xM'_{2y+2}$ where Q is a quadrifunctional silicone of the formula $SiO_2$, D represents a difunctional silicone of the formula $R_2SiO$ where each R is a monovalent alkyl, cycloalkeyl or phenyl group, x is 0 or an integer of 1 or greater, M' is an epoxy-modified monofunctional silicone of the formula $R^1_3SiO_{0.5}$ where $R^1$ is a monovalent alkyl, cycloalkyl or phenyl group or an epoxy group provided at least one $R^1$ is an epoxy group, y is an integer of from 1 to 4, inclusive.

8. A copolymer as defined in claim 1 wherein x ranges from 5 to 200.

9. A copolymer as defined in claim 8 wherein x ranges from 10 to 150.

10. A copolymer as defined in claim 1 wherein each R is methyl.

11. A copolymer as defined in claim 1 wherein each $R^1$ is an epoxy adduct.

12. A copolymer as defined in claim 11 wherein said epoxy adduct is selected from adducts of vinylcyclohexene oxide, allylglycidylether, glycidyl acrylate, vinyl norbornene monoxide, dicyclopentadiene monoxide and mixtures thereof.

13. A copolymer as defined in claim 12 wherein said epoxy adduct comprises 4-vinylcyclohexene oxide.

14. A polycarbonate copolymer comprising
    from about 50 to about 99.5 weight percent of a polycarbonate resin; and
    from about 0.5 to about 50 weight percent of a branched epoxy-modified silicon composition having the following general formulae:

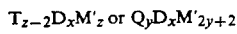

wherein T represents a trifunctional silicone of the formula $RSiO_{1.5}$ where R is a monovalent alkyl, cycloalkyl or phenyl group, D represents a difunctional silicone of the formula $R_2SiO$ where each R is independently as defined above, x is 0 or an integer of 1 or greater, Q is a quadrifunctional silicone of the formula $SiO_2$, M' is an epoxy-modified monofunctional silicone of the formula $R^1_3SiO_{0.5}$ where each $R^1$ is independently a monovalent alkyl, cycloalkyl or phenyl group or an epoxy group provided at least one $R^1$ is an epoxy group, y is an integer of from 1 to 4, inclusive, and z is an integer of 3 or greater.

15. A polycarbonate copolymer as defined in claim 14 wherein said polycarbonate resin comprises a poly(bisphenol A) carbonate.

16. A polycarbonate copolymer as defined in claim 14 wherein said epoxy group comprises 4-vinylcyclohexene oxide.

17. A method for preparing a polycarbonate having modified melt flow comprising
    (i) adding a branched epoxy-modified silicone copolymerizate to a dihydric phenol, optionally in the presence of a solvent;
    (ii) adding a carbonate precursor and reacting; and
    (iii) recovering the improved polycarbonate copolymer.

18. A branched epoxy-modified silicone composition having the following general formulae:

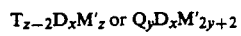

wherein T represents an trifunctional silicone of the formula $RSiO_{1.5}$ where R is a monovalent alkyl, cycloalkyl or phenyl group, D represents a difunctional silicone of the formula $R_2SiO$ where each R is independently as defined above, x is 0 or an integer of 1 or greater, Q is a quadrifunctional silicone of the formula $SiO_2$, M' is an epoxy-modified monofunctional silicone of the formula $R^1_3SiO_{0.5}$ where each $R^1$ is a monovalent alkyl, cycloalkyl or phenyl group or an epoxy group provided at least one $R^1$ is an epoxy group, y is an integer of from 1 to 4, inclusive, and z is an integer of 3 or greater.

19. A branched epoxy-modified silicone composition as defined in claim 18 of the formula $T_{z-2}D_xM'_z$ wherein T represents a trifunctional silicone of the formula $RSiO_{1.5}$ where R is a monovalent alkyl, cycloalkyl or phenyl group, D represents a difunctional silicone of the formula $R_2SiO$ where each R is independently as defined above, x is 0 or an integer of 1 or greater, M' is an epoxy-modified monofunctional silicone of the formula $R^1_3SiO_{0.5}$ where $R^1$ is a monovalent alkyl, cycloalkyl or phenyl group or an epoxy group provided at least one $R^1$ is an epoxy group, y is an integer of from 1 to 4, inclusive and z is an integer of 3 or greater.

20. A branched epoxy-modified silicone composition as defined in claim 18 of the formula $Q_yD_xM'_{2y+2}$ wherein Q is a quadrifunctional silicone of the formula $SiO_2$, D represents a difunctional silicone of the formula $R_2SiO$ where each R is independently is a monovalent alkyl, cycloalkeyl or phenyl group, x is 0 or an integer of 1 or greater, M' is an epoxy-modified monofunctional silicone of the formula $R^1_3SiO_{0.5}$ where $R^1$ is a monovalent alkyl, cycloalkyl or phenyl group or an epoxy group provided at least one $R^1$ is an epoxy group.

21. A branched epoxy-modified silicone composition as defined in claim 18 wherein x ranges from 5 to 200.

22. A branched epoxy-modified silicone composition as defined in claim 21 wherein x ranges from 10 to 150.

23. A copolymer as defined in claim 18 wherein said epoxy group is selected from vinylcyclohexene oxide, allylglycidylether, glycidyl acrylate, vinyl norbornene monoxide, dicyclopentadiene monoxide and mixtures thereof.

24. A copolymer as defined in claim 23 wherein said epoxy group comprises 4-vinylcyclohexene oxide.

25. A process for preparing an epoxy-modified branched silicone comprising reacting a silicone hydride of the formula $T_{z-2}D_xM''_z$ or $Q_yD_xM'_{2y+2}$, where T represents a trifunctional silicone of the formula $RSiO_{1.5}$ where R is a monovalent alkyl, cycloalkyl or phenyl group, D represents a difunctional silicone of the formula $R_2SiO$ where each R is independently as defined above, x is 0 or an integer of 1 or greater, Q is a quadrifunctional silicone of the formula $SiO_2$, M'' represents a monofunctional silicone of the formula $R^2_3SiO_{0.5}$ wherein each $R^2$ is independently hydrogen or monovalent alkyl, cycloalkyl or phenyl group provided at least one $R^2$ is hydrogen, y is an integer of from 1 to 4, inclusive, and z is an integer of 3 or greater, with an epoxy compound in the presence of an effective amount of a hydrosilation catalyst.

26. A process as defined in claim 25 wherein said silicone hydride comprises a trifunctional silicone hydride of the formula $T_{z-2}D_xM''_z$ wherein T, D, x, M'' and z are as defined above.

27. A process as defined in claim 26 wherein said silicone hydride comprises a quadrifunctional silicone hydride of the formula $Q_yD_xM''_{2y+2}$ wherein Q is a quadrifunctional silicone of the formula $SiO_2$, D represents a difunctional silicone of the formula $R_2SiO$ where each R is independently is a monovalent alkyl, cycloalkyl or phenyl group, x is 0 or an integer of 1 or greater, M'' represents a monofunctional silicone of the formula $R^2_3SiO_{0.5}$ wherein each $R^2$ is independently hydrogen or monovalent alkyl, cycloalkyl or phenyl group provided at least one $R^2$ is hydrogen, y is an integer of from 1 to 4, inclusive.

28. A process as defined in claim 25 wherein x ranges from 5 to 200.

29. A process as defined in claim 28 wherein x ranges from 10 to 150.

30. A process as defined in claim 25 wherein said epoxy compound comprises vinylcyclohexene oxide.

31. A process as defined in claim 25 wherein said catalyst comprises a rhodium based catalyst.

* * * * *